(12) United States Patent
Fien et al.

(10) Patent No.: US 7,982,931 B2
(45) Date of Patent: Jul. 19, 2011

(54) DATA SYSTEM FOR STORING HOLOGRAPHIC MEDIA

(75) Inventors: Gene S. Fien, Lenox, MA (US);
Edward Merritt, Lenox, MA (US)

(73) Assignee: Intellectual Ventures Holding 32 LLC, Las Vegas, NV (US)

( * ) Notice: Subject to any disclaimer, the term of this patent is extended or adjusted under 35 U.S.C. 154(b) by 1030 days.

(21) Appl. No.: 11/697,146

(22) Filed: Apr. 5, 2007

(65) Prior Publication Data

US 2008/0247014 A1 Oct. 9, 2008

(51) Int. Cl.
*G03H 1/30* (2006.01)

(52) U.S. Cl. .......................................... 359/26

(58) Field of Classification Search ................... None
See application file for complete search history.

(56) References Cited

U.S. PATENT DOCUMENTS

| | | | |
|---|---|---|---|
| 3,535,992 A | 10/1970 | Goldmark et al. | |
| 3,567,305 A | 3/1971 | Collier et al. | |
| 3,746,783 A | 7/1973 | Gerritsen et al. | |
| 3,763,311 A | 10/1973 | Bartolini et al. | |
| 3,949,235 A | 4/1976 | Miyazaki et al. | |
| 4,007,481 A | 2/1977 | St. John | |
| 6,466,372 B1 * | 10/2002 | Morris et al. | 359/567 |
| 2006/0055993 A1 | 3/2006 | Kobayashi et al. | |

OTHER PUBLICATIONS

"Clash of the Titans", 30 minutes and 38 seconds through 30 minutes and 40 seconds into the run time, Directed by Desmond Davis, Released Jun. 12, 1981 by Metro-Goldwyn-Mayer (MGM) Studios.*

* cited by examiner

*Primary Examiner* — Stephone B Allen
*Assistant Examiner* — Derek S Chapel
(74) *Attorney, Agent, or Firm* — Stolowitz Ford Cowger LLP

(57) ABSTRACT

A master holographic media storing large quantities of holographic media is disclosed. Holographic images may be recorded onto individual Child Plates. A Child Plate may be obtained by culling a portion of a starting or working parent holographic plate with the Child Plate portion comprising all the necessary data required for holographic image reconstruction. A series of plurality of Child Plates are arranged on and compiled to the master holographic media. The resulting information stored on the master holographic media is capable of being displayed as a continuous three-dimensional holographic image.

30 Claims, 10 Drawing Sheets

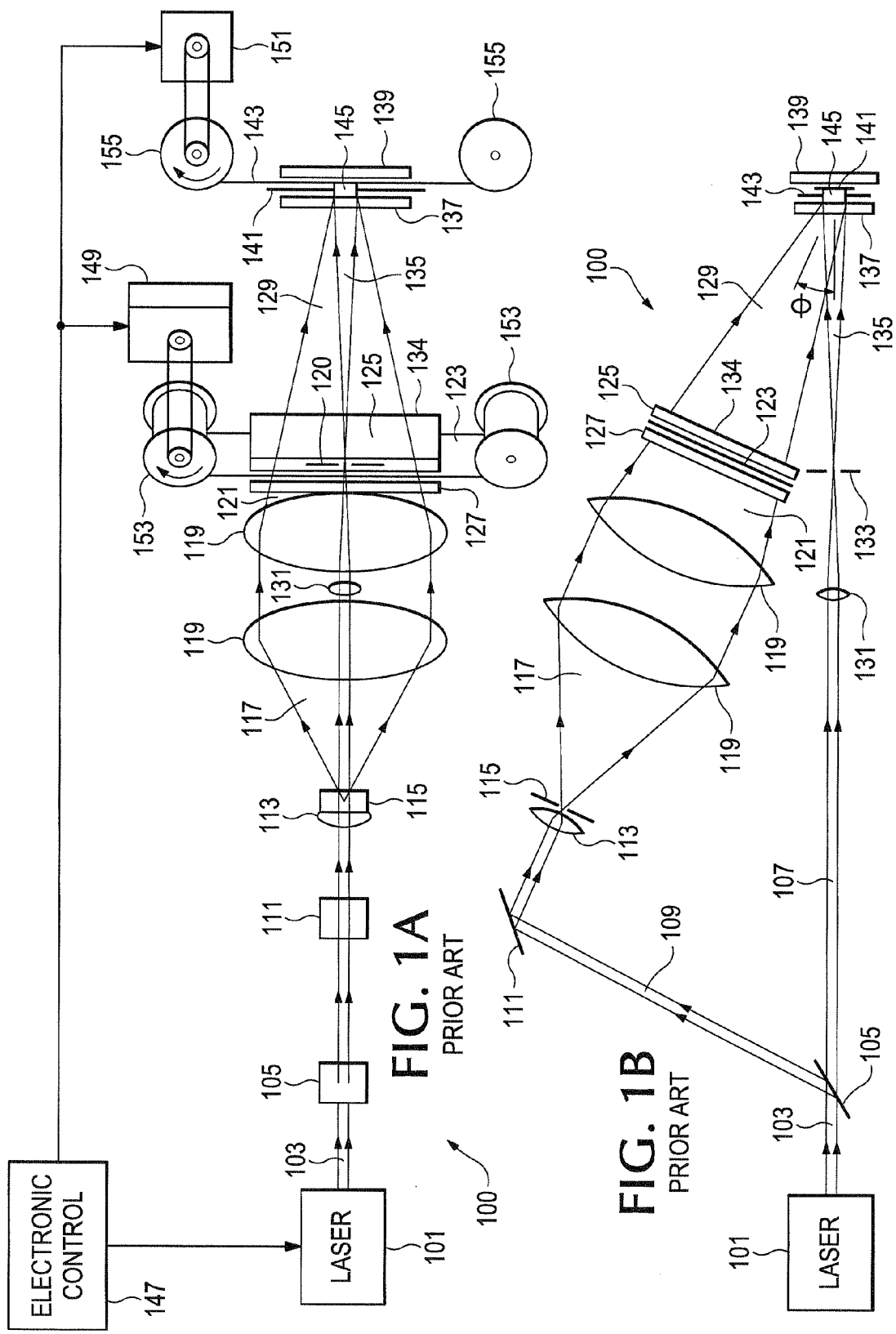

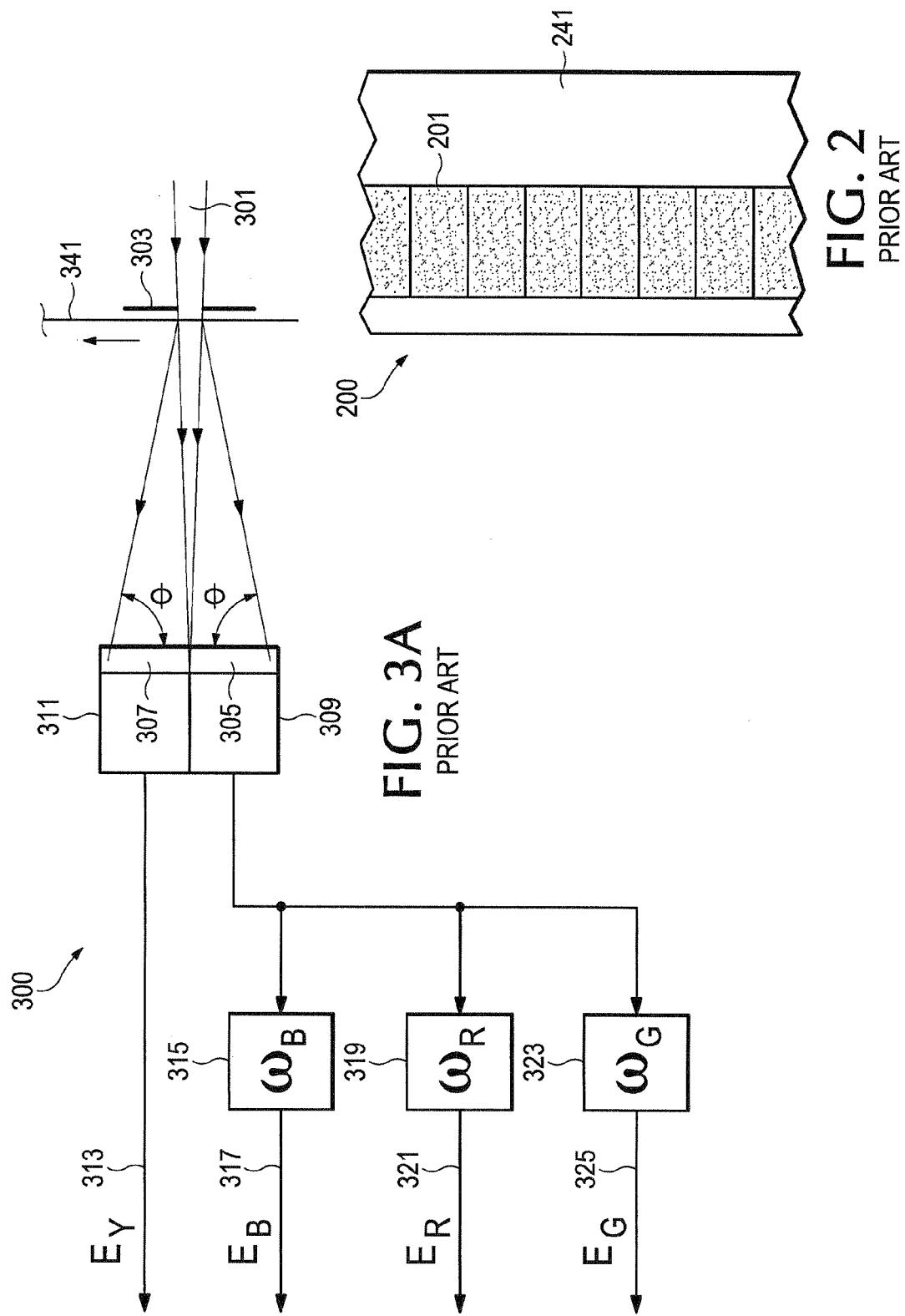

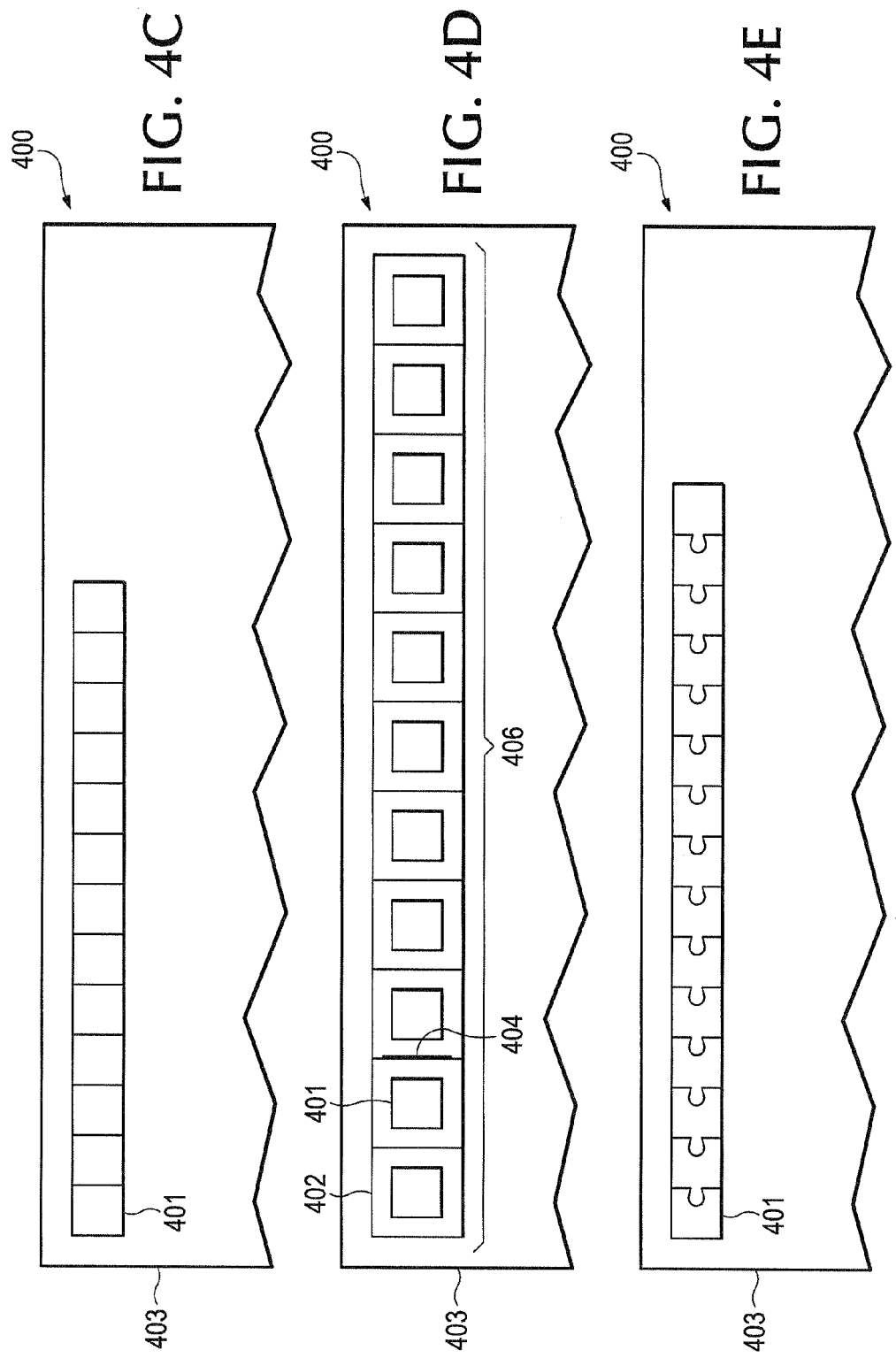

DATA SYSTEM FOR STORING HOLOGRAPHIC MEDIA

BACKGROUND OF THE INVENTION

1. Technical Field

The present invention relates to the creation of a holographic media display system that combines physical media or digitally stored files with a digital holographic player hardware system. The result is the creation of a compact and portable multimedia holographic viewing experience.

2. Background Art

A hologram is a microscopic pattern of interference fringes, representing an interaction of two beams of coherent light. Therefore, the hologram is a photographic registration of the interference pattern formed by the two beams, with one of the beams consisting of scattered light from a physical object. Once properly illuminated, the hologram may produce a three dimensional image of the physical object. In recent years, a great deal of effort has been put forth towards developing displays using holography techniques.

FIGS. 1A and 1B depict a side and top view, respectively, of an example of a holographic film printing process. A coherent light source 101, or laser, provides a pulsed beam 103. The pulsed beam 103 is then split into two identical beams, an object beam 109 and a reference beam 107, via a beam splitting cube 105. The object beam 109 is then deflected, via a mirror 111, onto a beam expander consisting of a lens 113 and an aperture 115. The resultant diverging beam 117 is then sent through an optical system 119, which is used to maintain a uniform intensity across the planes of coherent light 121, at which the object will be placed. In the present example, the object is a frame from a movie film 123. The film 123 may be held in place by transparent plates 127 and 125. An anti-reflection exit surface 134 may be used to reduce reflections.

Once the object beam 121 has passed through the film 123, a modified object beam 129 will be emitted through the anti-reflection exit surface 134. The modified object beam 129 carries imaging information of the object. The modified object beam 129 is then directed towards a photosensitive hologram detector strip 141. The photosensitive hologram detector 141 is placed behind a mask 143 and is enclosed by transparent members 137 and 139.

The modified object beam 129 is combined, or interfered, with a diverging reference beam 135 at an aperture 145 of the mask 143. The diverging reference beam 135 is obtained by directing the reference beam 107 through a lens 131. The lens 131 brings the beam to a point focus in an aperture 133 resulting in the divergence. The interference of the diverging reference beam 135 and the modified object beam 129, at a finite angle θ, forms a holographic pattern each time the coherent light source 101 is pulsed. Therefore, for every pulse of the laser 101, a single movie frame may be recorded as a single holographic image.

An electronic control 147 may be used to advance the movie film 123 with the use of a motor 149 and rollers 153. The electronic control 147 may also be used to advance the photosensitive hologram detector strip 141 with the use of a motor 151 and rollers 155. Synchronization of the laser pulsing, the advancement of the movie film 123, and the photosensitive hologram detector strip 141 may also be achieved via the electronic control 147.

FIG. 2 provides an illustrative example of a portion of the photosensitive hologram detector 200. The detector comprises a strip 241 (or 141 in FIGS. 1A, 1B) consisting of a number of rows. Each row, for example row 201, comprises a single hologram representing a movie frame. The hologram comprises luminance information as well as color information used in the image reconstruction process.

FIG. 3A depicts a hologram display apparatus 300. A converging coherent beam 301 is passed through an aperture 303 onto the holographic detector strip 341 at a reconstruction angle θ. In holographic reconstructions, the same laser and angle employed for the recording process, is typically used. The illumination of the holographic detector strip 341 results in the reconstruction of two images, a luminance signal image 307 and a color signal image 305. Two raster scan type image detecting tubes 309 and 311 are positioned to receive the signals 305 and 307, respectively. The detecting tubes produce time varying electrical signal outputs based on the signals 305 and 307. Bandpass filters 315, 319, and 323 allow for the transmission of blue, red, and green carrier frequency signals, respectively, to pass. The luminance ($E_y$), blue ($E_B$), red ($E_R$), and green ($E_G$) electrical signal outputs 313, 317, 321, and 325 are then passed on to signal processing devices and eventually sent to a receiver antenna for a two-dimensional display, similar to that of a standard television.

Other forms of holographic media storage have also been explored, for example, Holographic Versatile Discs (HVD). HVDs are typically used for document storage and allow for the reconstruction of a two-dimensional holographic image. HVD systems are based on an optical disc technology that employs a technique known as collinear holography. In collinear holography two lasers, typically one red and one blue-green, are collimated in a single beam. The blue-green laser reads data encoded as laser interference fringes from a holographic layer near the top of the disc. The red laser has the dual function of being used as a reference beam, as well as to read servo information from a regular CD-style aluminum layer near the bottom. Servo information may be used to monitor the position of the read head over the disc, similar to the head, track, and sector information on a conventional hard disk drive. On a CD or DVD, this servo information is interspersed amongst the data.

FIG. 3B provides an example of how a HVD holographic media file may be recorded. The top layer of the HVD, or the volumetric recording layer 350, is the portion of the HVD where the holographic media files 351 are stored. Each media file 351 represents a page of data 352. As is shown in FIG. 3B, an HVD may store holograms in overlapping patterns, while using the servo information to access a desired page.

In contrast, a DVD will typically store bits of information side-by-side. An HVD makes use of a thicker recording layer than that of a DVD. The HVD also utilizes almost the entire volume of the disk, instead of just a single thin layer. Therefore, HVD systems may store approximately 200 times the amount of information a DVD is capable of storing.

SUMMARY OF THE INVENTION

Although many advances have been made in the field of holographic media display systems, currently there are no systems which are capable of continuously displaying three-dimensional images. Current technology does not allow for the display of an entire feature film using three-dimensional imagery.

Additionally, present holographic display systems do not contemplate a method whereby holographic media can be recorded, easily replicated, and exhibited in a home environment. Currently no system exists that is adaptable to large and small consumer applications. No display systems currently available are capable of using a variety of laser and fixed media sources configured with different laser strengths and lengths. Also, there are no portable systems, or systems capable of larger displays, with size of installation and/or laser strength not being a barrier in the display application.

Holographic systems may be large in size and spread out over a large broadcasting area, or may be compact enough to fit in spaces smaller than a desk top. In terms of overall size, holographic technology is mainly limited by the size of the individual component parts. The idea of creating a 2-hour feature film, with approximately 432,000 individual frames of film, at a rate of 60 frames per second, in three-dimensional holographic form, has been a daunting task for holographers. Such a feature film would require creating 432,000 holographic plates, representing a respective frame of film, and displaying the plates in order at a rate of 60 plates per second. There are no systems currently available which are capable of withstanding the storage capacity or speed requirements needed to display a three-dimensional feature film.

Accordingly, a system and method is presented by the present invention wherein tiny holographic plates, each plate comprising data to reconstruct an entire holographic image, are assembled on a single piece of fixed media, or a master holographic media. It should be appreciated that the master holographic media may take any form, for example a disk, square, rectangle, or any other form. The individual holographic plates enable a three-dimensional holographic video experience that can be easily replicated, transportable, and displayed in small or large venues, by holographic players of different sizes and strengths.

The invention system for storing holographic media may comprise master holographic media, and a plurality of Child Plates arranged on the master holographic media. Each Child Plate may comprise a respective recorded holographic image, the holographic images may be capable of display in a three-dimensional and continuous manner. Generally a "Child Plate" is a segment cut or otherwise annexed from a master or initial hologram photographic plate.

A Child Plate, of the plurality of Child Plates, may be a portion of a parent holographic plate, wherein the portion may be obtained using a nanotechnology cutting technique. The portion may also be obtained using a punch-out method. Multiple Child Plates copies, comprising a subset of the parent holographic plate data information, may be obtained from the parent holographic plate. Each Child Plate, of the multiple Child Plates, may be removed at an angle of reconstruction and in a similar location on the parent holographic plate. The plurality of Child Plates may also comprise mirrored bottoms.

The plurality of Child Plates may be placed on the master holographic media disk using optical tweezers. The plurality of Child Plates may also be arranged on the master holographic media in a predetermined order. The plurality of Child Plates may be placed on the master holographic media with an adhesive, and/or using a magnetic force. The plurality of Child Plates may also comprise interlocking shapes and may be placed on the master holographic media in a locked arrangement. Each Child Plate, of the plurality of Child Plates, may also be placed in a respective frame, the frame may comprise locator information. Different sections of the plurality of Child Plates may be accessed using a dynamic library link.

The master holographic media may comprise a Child Plate back-up portion. The master holographic media may also comprise a contact strip, where each Child Plate, of the plurality of Child Plates, may be addressable via the contact strip. The master holographic media may also comprise a storage region for storing non-holographic data, where each Child Plate, of the plurality of Child Plates, may be individually synchronized with the non-holographic data.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1A and 1B are side and top views, respectively, of a two dimensional holographic recording process according to the prior art;

FIG. 2 is a depiction of a holographic film strip according to the prior art;

FIG. 3A is a schematic of a two-dimensional holographic display system according to the prior art;

FIG. 4C is an illustrative example of Child Plate placement using adhesives according to an embodiment of the invention;

FIG. 4D is an illustrative example of Child Plate placement using framing technology;

FIG. 4E is an illustrative example of Child Plate placement using a locking configuration;

DETAILED DESCRIPTION OF THE INVENTION

A description of example embodiments of the invention follows.

Once a holographic image has been recorded, illuminating a coherent laser (of the same wavelength and angle of incidence as employed during the recording stage) on any portion of the recorded data will yield a complete three-dimensional reconstruction. Exploiting the fact that the smallest piece of a holographic photo plate will still generate the entire end image hologram, a portable and compact holographic display system may be obtained. The process of generating a moving image at a desired frame rate per second may be achieved by cutting small samples, or Child Plates, from each holographic photo plate, or parent holographic plate, comprising imaging information for the reconstruction of a movie frame. The imaging information may be a subset of the parent holographic plate data information, which may be used for reconstructing the image originally recorded on the parent holographic plate it should be appreciated that "Child Plate" as used herein is a segment cut or otherwise annexed holographic recording from a master hologram photographic plate.

Figure 4A:
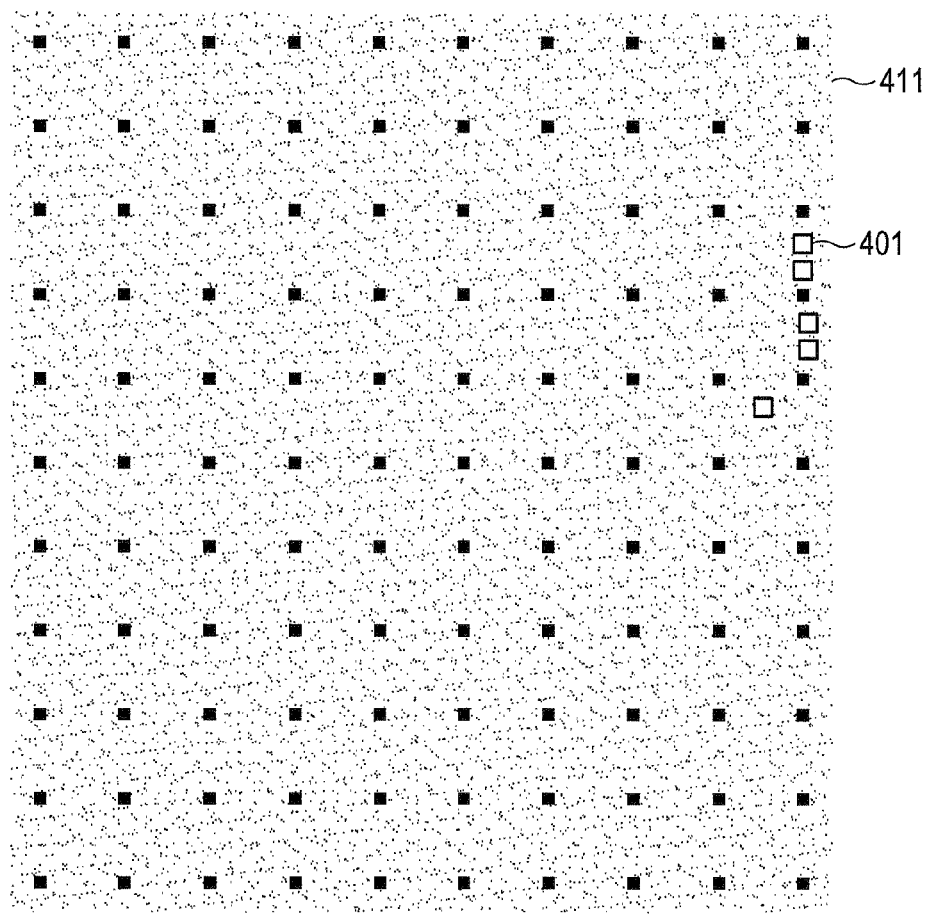
FIG. 4A is a schematic layout of a parent holographic plate according to an embodiment of the present invention.

FIG. 4A shows an example of a parent holographic plate 411 comprising a recorded holographic image. The writing of the parent holographic plate 411 may be achieved real time during the filming of a movie, or may be achieved using a 35 mm film. The writing process may also be achieved via 3D modeling software. The modeling software may also be used in combination with specific display media. The display media, such as LCD or liquid background, may be used to accentuate the images dimensionality and may also incorporate real time modeling, such as the kind used in stop frame animation.

A fusion of these techniques can also be used to incorporate different source elements and visual effects common in feature films and television programming. It should be appreciated that any holographic writing method known in the art may be employed in the present invention, for example the methods shown in FIGS. 1A and 1B.

Once a holographic recording has been obtained, holographic media, or Child Plates 401, may be culled from the parent holographic plate. The Child Plates 401 may be obtained from the parent holographic plate at very small increments (i.e., in the micron range) using nanolithography cutting tools. The nanolithography cutting tools may be used to slice a tiny sample 401 of the parent holographic plate representing a frame of film, or video. For example, a laser may be employed to cut the Child Plate portions 401 from the parent holographic plate. Utilizing a cutting laser at the same angle as the angle of reconstruction, may improve the accuracy of the image reconstruction. Additionally, removing multiple Child Plates 401 in substantially the same location on the parent holographic plate 411 (i.e., the majority of the Child Plates 401 may be removed from the center of the parent holographic plate 411), may also improve image reconstruction accuracy. Preferably each Child Plate 401 is removed substantially from the same location and angle as other Child Plates 401 that will collectively be used to form a master holographic media 400 (FIG. 4B described below) and in a preferred embodiment is removed from the center of the parent holographic plate 411 so that the laser need only be calibrated to the center of each Child Plate 401.

Figure 3B:
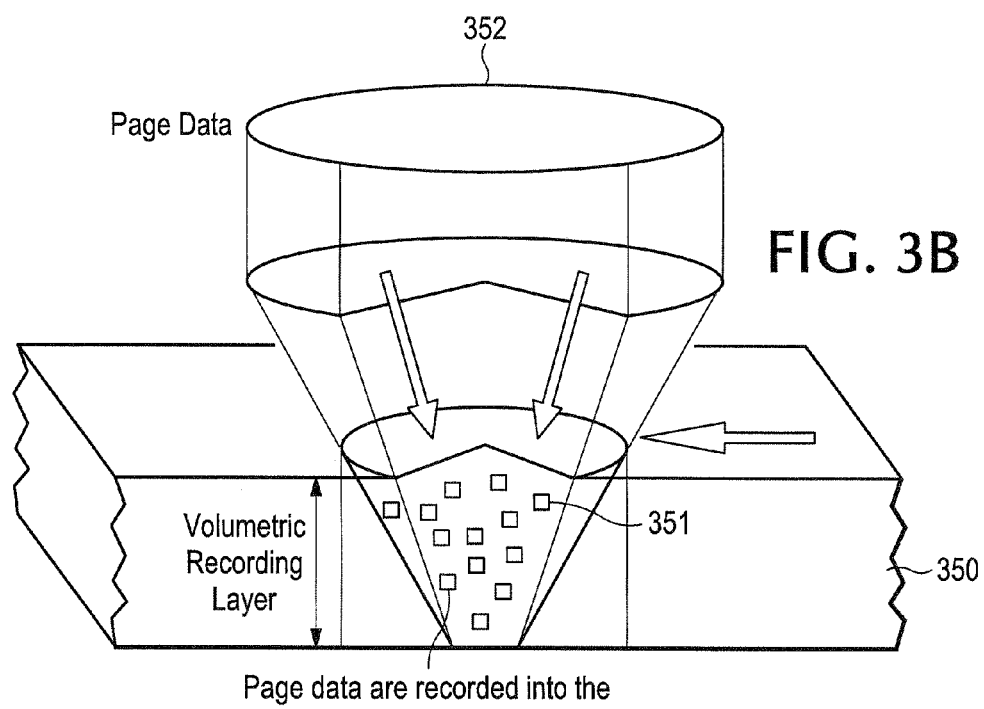
FIG. 3B is an illustrative example of two-dimensional data storage in Holographic Versatile Discs according to the prior art.

It should be appreciated that any nano-scale technology known in the art may be employed for obtaining the Child Plates from the parent holographic plate 411. For example, the various Child Plates 401 may be mass manufactured. Employing a "punching" technique, thousands of Child Plates may be obtained simultaneously. Such a technique will allow for easy duplication of the recorded holographic image. Whereas in the prior art holographic media storage (as shown in FIGS. 2 and 3B), in order to duplicate a recorded holographic image, the entire holographic recording process would have to be repeated (as shown in FIGS. 1A and 1B).

Figure 4B:
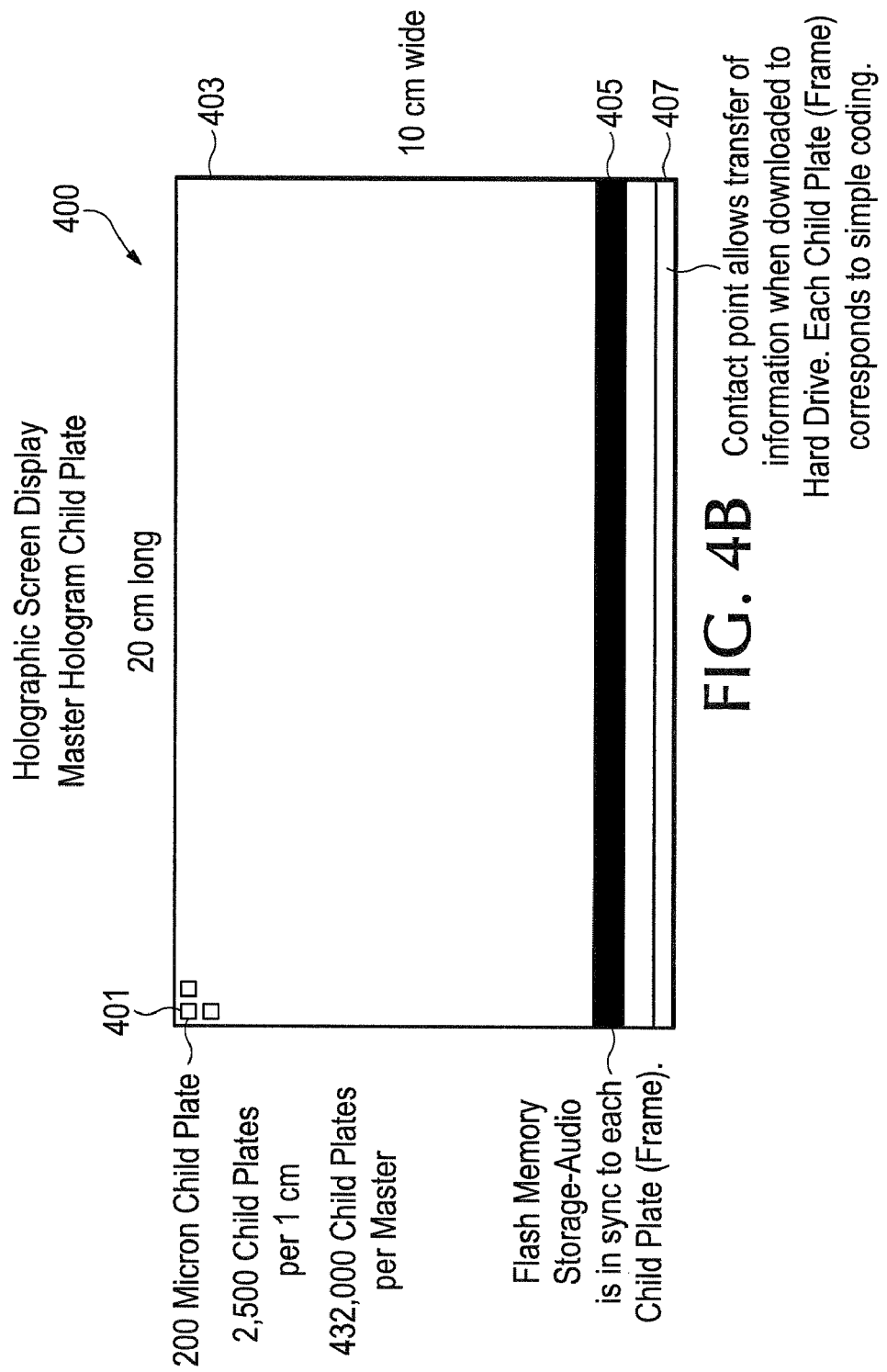
FIG. 4B is an illustrative example of Child Plate processing according to the present invention.

FIG. 4B provides an illustrative example of a master holographic media 400. Once the Child Plate sections 401 have been obtained, they may be placed on the writable area 403 of a master holographic media 400. The master holographic media 400 may be prepared for recording using any number of methods well known in the art. Typically, a glass surface is treated with gelatin to make it chemically 'sticky'. The added gelatin layer may then be hardened with chromium or formaldehyde. Once the hardened gelatin film has been established, the film may then have soaked into it a silver salt, and subsequently soaked in potassium or lithium bromide to obtain an ultra-fine grain precipitate of silver bromide. The bromide solution also incorporates a dye to make the plate photo-sensitive in the required wavelength range. A sensitizer may be added to improve the effectiveness of the holographic plate.

In an example configuration, the master holographic media 400 may comprise a size dimension of 10 cm by 20 cm. This size dimension would be capable of carrying approximately 432,000 individual Child Plates. This example size dimension may be capable of storing an entire feature film, an index, table of contents, as well as a start and navigation system for the stored media elements.

The different sections of the media may be tied to dynamic link library (DLL) actions in the hardware enabling the viewer to control settings, and the table of content commands from the media directory passed through to the hardware. It should be appreciated that any dimensions may be used in the fabrication of the master holographic media 400. For example, the dimensions may be increased if it was desired to include more information on the disk.

A strip 407 on the master holographic media 400 is used as a contact point that allows for a transfer of information when downloaded to a hard drive. Each Child Plate 401 may be accessed via the strip 407 with the use of software coding (e.g., SMPTE). A strip 405 may be used for flash memory storage. The flash memory may be used to store audio files which may be synchronized with the individual Child Plates via software coding (e.g., SMPTE).

One technique which may be used in Child Plate 401 placement is optical trapping. Optical trapping makes use of optical, or laser, tweezers. Once light interacts with an object and undergoes changes in direction, due to reflection or refraction, a change in the light's momentum will occur. Due to the laws of physics, the object must undergo an equal and opposite momentum change. The object's momentum change results in a radiation force acting on the object. The radiation force comprises a scattering force along the direction of light propagation, and a gradient force due to the light intensity distribution around the object.

An optical trap may be created when a laser beam is focused to a small spot with a high numeric aperture (NA) microscope objective lens. Since the light intensity at the center is greater than that at the edges, the gradient force drives the object positioned within the laser focal point toward the central point. Meanwhile, scattering force may act to push the particle out of the center, along the direction in which the light is traveling. If the gradient forces caused by refracted light are greater than the scattering forces caused by reflected light, the net effect will be a force which holds the particle in the center of the beam. Thus, a stable optical trap is obtained.

Holographic optical trapping (HOT) may also be employed as a technique for Child Plate placement. HOT comprises replacing the single focused laser beam with a spatial light modulator. The spatial light modulator may enable the light, from a single laser beam, to be sculpted into as many as 200 independently controllable optical tweezers. The optical tweezers may be positioned and moved in three directions. It should be appreciated that any nano-scale movement technique known in the art may be employed in the placement of Child Plates 401.

During the placement process, each Child Plate 401 may be aligned side by side onto the master holographic media 400 writable area 403, and set into place with the use of an adhesive, as shown in FIG. 4C. Alternatively, each Child Plate 401 may be placed in a thin a tiny brace, or frame 402, as shown in FIG. 4D. The individual frames 402 may be adhered to each other forming a single frame set 406. This process creates a frame between each Child Plate 401. The individual frames 402 may also comprise locator information 404 on the side of the frame. The locator information 404 may be used during the reading process of the Child Plates 401. The Child Plates 401 may also be bonded by magnetic forces, or adhesives, surfaces along the master holographic media 400, or between the Child Plates 401 and frames 402. The frame 402 may be comprised of metal, carbon, glass, polymer, or any other durable material allowing for the master holographic media to easily slide into a holographic player.

Additionally, the Child Plates 401 may be cut into interlocking shapes and placed in a locked arrangement, as is shown in FIG. 4E. It should be appreciated that any other form of placement or adhesion known in the art may be employed. It should be appreciated that although FIG. 4B only displays three Child Plates 401, the entire writable area 403 may be used in the placement of the Child Plates 401. Therefore, any number of Child Plates 401 may be placed in order to reconstruct the feature film.

The Child Plates 401 may be placed in a sequential order, or the Child Plates 401 may be placed in a predetermined order. Placing the Child Plates 401 in a predetermined order may allow for the use of tag and read systems, automated gates, programmable laser positioning, or any other read access method. The Child Plates 401 may also be placed in a consecutive ordering, wherein the Child Plates are aligned in relation to the sequence in which they are expected to be imaged or illuminated.

Once the Child Plates 401 have been established, an efficient read access method may be used. A typical feature film requires a reading rate of approximately 60 frames per second, with the average movie or any media/content production consisting of approximately 2 hours worth of data. The total number of Child Plates 401 required for this type of data would be approximately 432,000. The master holographic media 400 is capable of storing an entire feature film, and displaying this film as a true three-dimensional holographic image.

Figure 5:
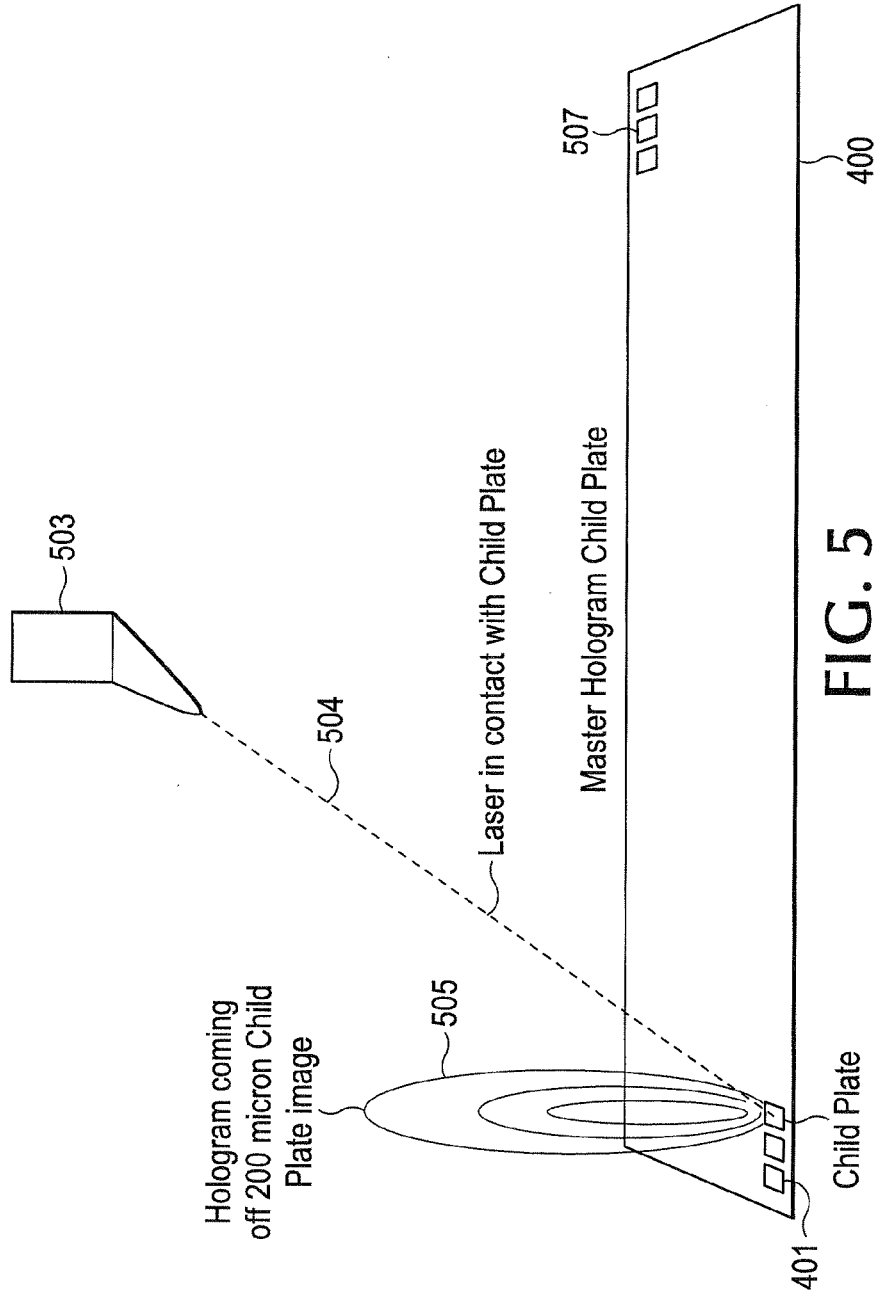
FIG. 5 is an illustrative example of a three-dimensional holographic reading process according to an embodiment of the present invention.

FIG. 5 depicts an example of a master holographic media reading. A laser 503 may be used to direct a coherent laser beam 504, similar to the reference beam used during the writing process, onto an individual Child Plate 401 on the master holographic media 400. The recorded hologram on the Child Plate 401 diffracts the beam according to the specific pattern of light interference stored on the Child Plate. The resulting light recreates the holographic image 505 of the film frame that established the light interference pattern in the first place. A light sensor may be used to detect and amplify the holographic image 505.

In operation, a laser may move among the Child Plates 401 on the master holographic media 400 in a programmed consecutive or non-consecutive order illuminating each proscribed Child Plate at a proscribed frame rate. As an example, the master holographic media 400, which may be the size of a baseball card, may be calibrated to move one frame increment at a rate of 60 Child Plate frames per second. The incrementing of the master holographic media 400 may be performed so that the path of the laser, which may or may not pulse between frames to remove blurring, illuminates the Child Plates 401 without moving the laser. Stabilizing the laser may help reduce reading errors.

In a stable laser configuration, the individual Child Plates 401 may comprise a see through or mirrored bottom. The laser may be positioned to illuminate the Child Plate 401 with a beam perpendicular to the surface of the plate 401, with each of the mirrored bottoms being positioned to the reconstruction angle. This configuration may be ideal for reading systems comprising stable, or non-moving, lasers. Thus, the laser system does not need to be recalibrated for each master holographic media 400, since the required angle for illumination is supplied via the mirrored bottoms of the individual Child Plates 401. Therefore, the master holographic media 400 may simply move incrementally into place, with the laser 503 illuminating each Child Plate 401 at the necessary speed and at the necessary time.

Alternatively, the laser 503 may move incrementally into place while the master holographic media 400 remains stationary, or the master holographic media 400 may also move incrementally in place. Multiple lasers may also be employed in the reading of the various Child Plates 401.

The master holographic media 400 may also comprise a backup system on the disk in the event that a Child Plate 401 is damaged. A section of the master holographic media 400 may be used to supply duplicate Child Plates 507 in the event a Child Plate 401 is damaged or lost. A scanner may be used to automatically scan the surface of the individual Child Plates 401. In the event that a defect in one of the Child Plates 401 is detected, the DLL may be programmed to move the laser 503, or disk 400, to skip the damaged Child Plate 401. Instead of imaging the damaged Child Plate, the laser may instead illuminate the backup image of the corresponding duplicate Child Plate 507.

Multiple laser reading techniques may be employed on each Child Plate to enable greater coloration, and/or depth and dimensionality of the images. Rated sequential access using programmed position or tag and read systems, for example wi-fi, may be used as Child Plate accessing techniques as well. Specifically, in a configuration where each Child Plate has a laser trained upon it, for example via use of mirrored refraction and reflection of lasers, or with the use of multiple lasers, an automated gate may be employed to allow only the Child Plate in sequence to have a window opened in the gate.

Labeling techniques may also be employed in a reading scheme, for example with the use of frame locators 404. The frame system may also be used in the communication with a holographic player CPU and software. For example, if a user wishes to skip to a certain scene, or Child Plate 401, of the feature film, the frame system may be utilized to navigate the laser read system. Additionally, microwave transmissions or RFID tagging systems may allow the laser to read non-sequentially placed Child Plates in sequential order.

As mentioned before, the angle the laser illuminates the Child Plates 401 in the prepared master holographic media 400 is preferably the same angle that the Child Plates 401 were taken from the original parent holographic plate 411 in FIG. 4A. This maximizes accurate image reproduction.

Figure 6A:
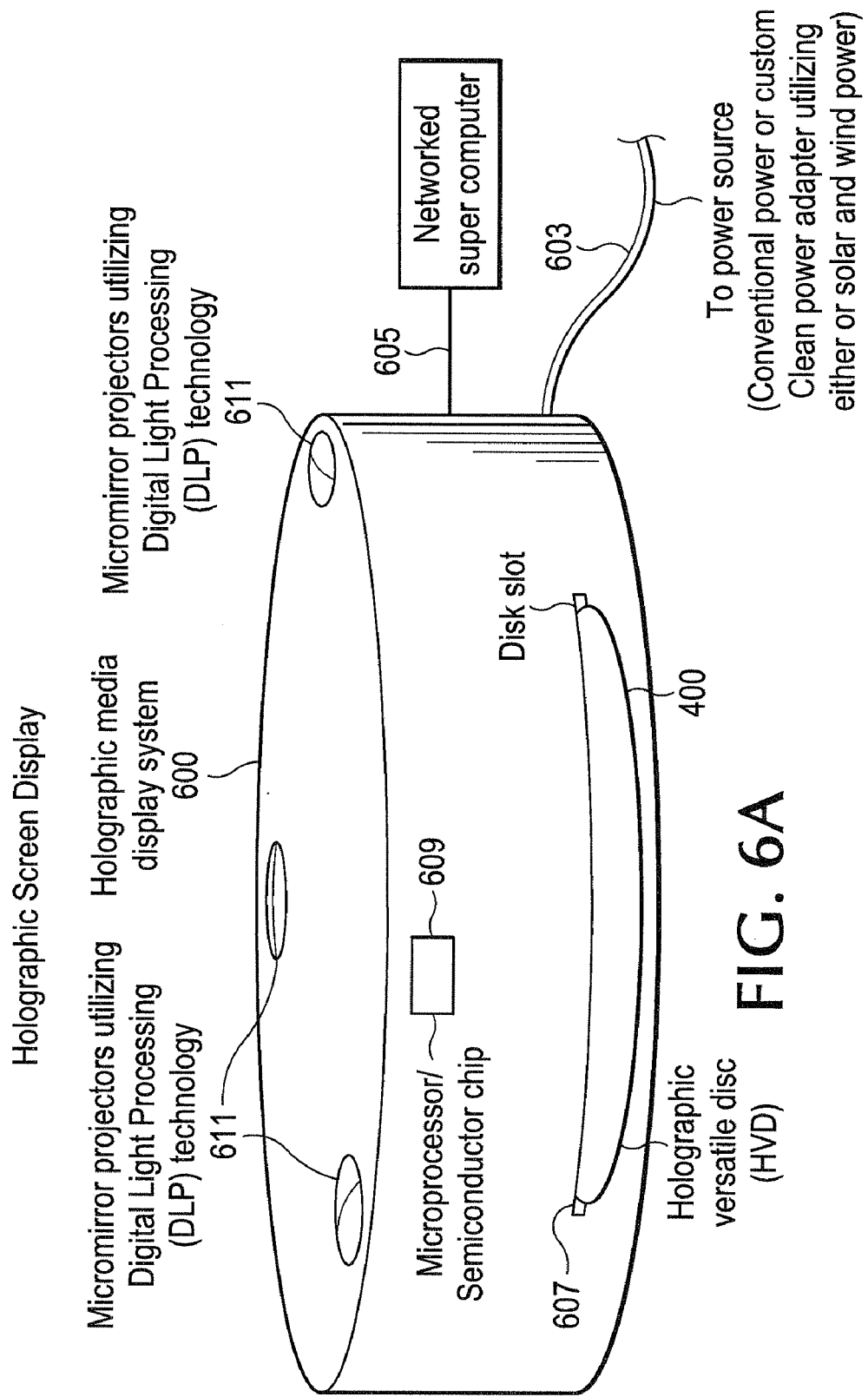
FIGS. 6A and 6B are schematic illustrations of a holography media player according to an embodiment of the present invention.
Figure 6B:
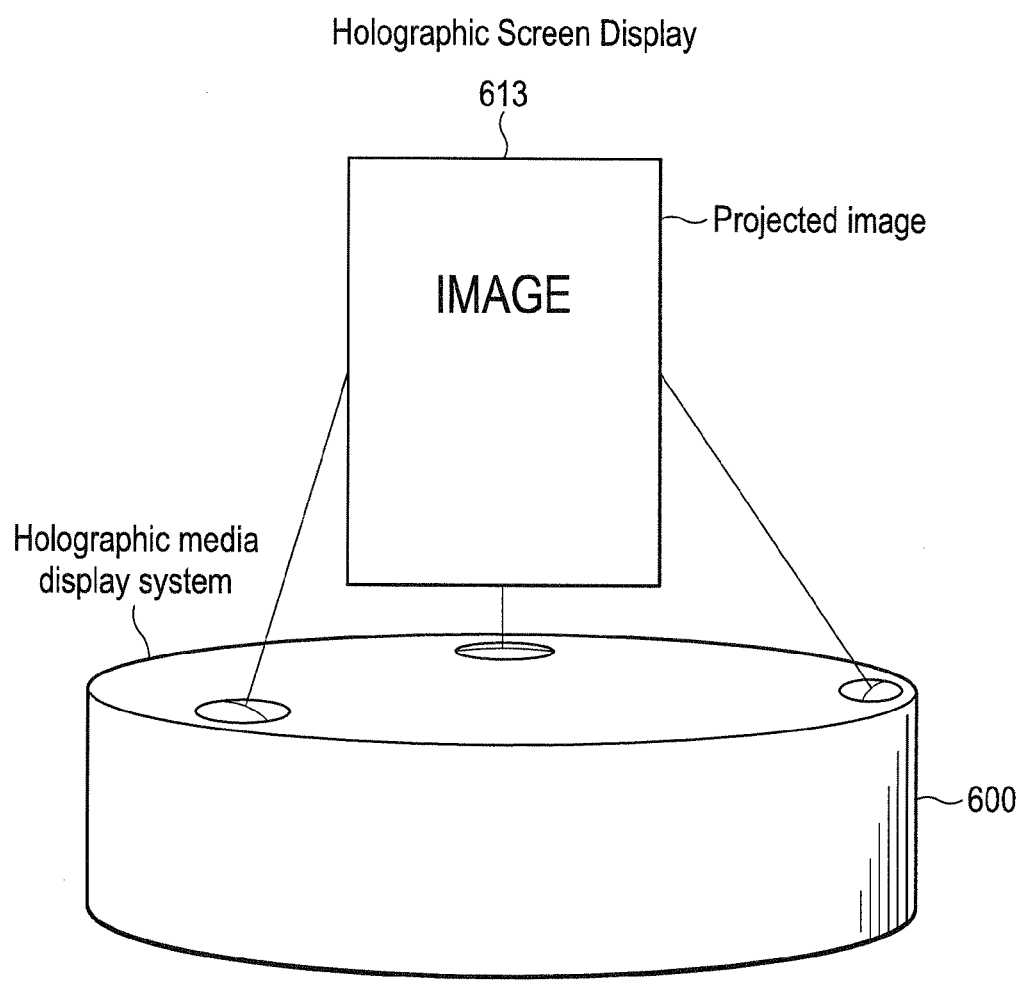

FIGS. 6A and 6B depict a holography disk player 600 used in the reading and displaying of information stored on the master holographic media 400. The player 600 comprises a slot 607 used in the insertion of the master holographic media 400. The holographic player 600 may further comprise a microprocessor 609, or semiconductor chip, employed in the reading and displaying process. For example, microprocessor 609 executes programmed ready sequence, Child Plate 401 failure recovery and the other ready/access features detailed above. Micro-mirror projectors 611, utilizing digital light processing (DLP) technology, are used to project the three-dimensional holographic image 613.

Figure 6C:
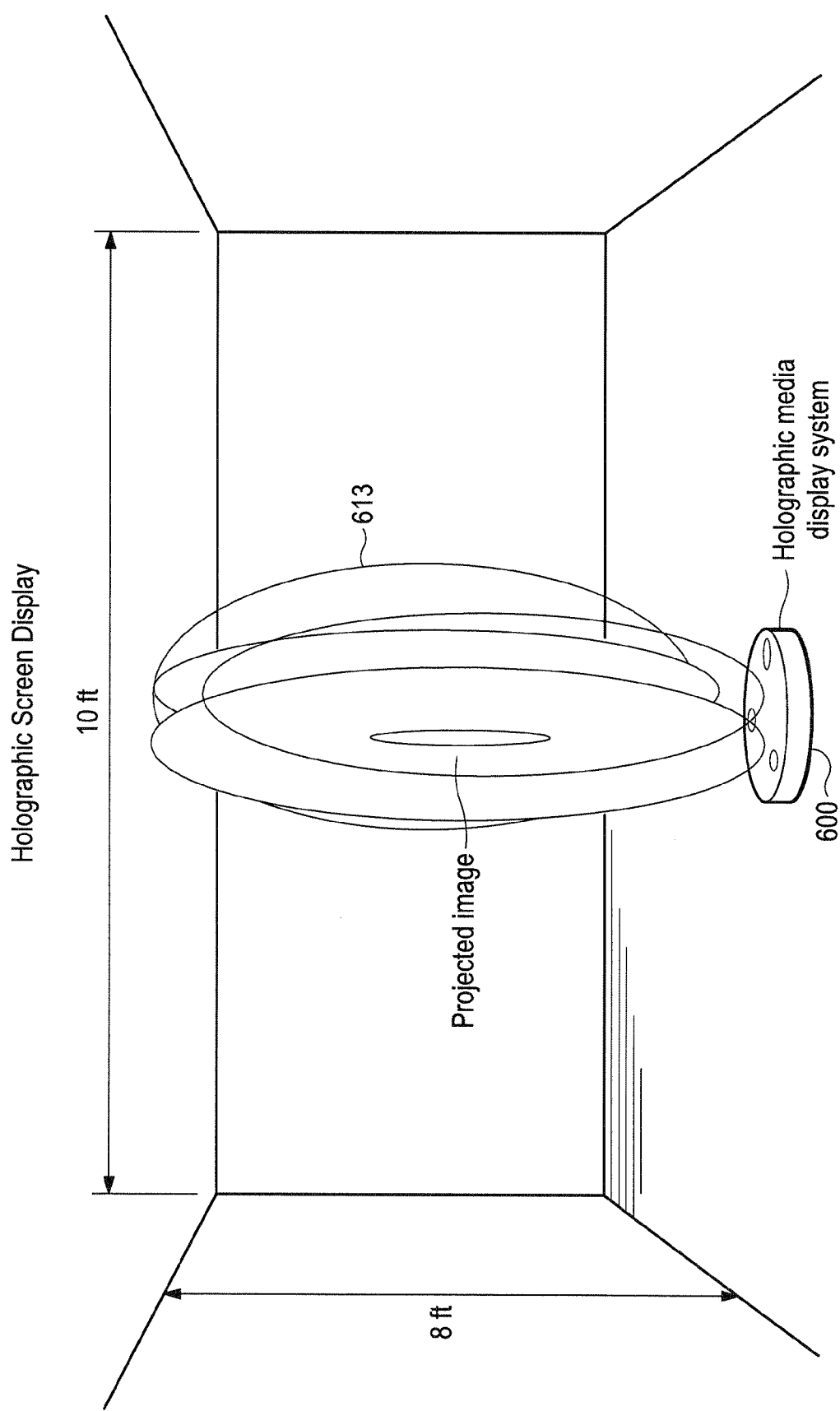
FIG. 6C is a schematic illustration of the holography media player, of FIGS. 6A and 6B, in a viewing environment according to an embodiment of the present invention.

FIG. 6C provides an illustrative example of how the three-dimensional holographic image 613 may be viewed in a home environment. The image of the holographic media projects as a continuous hologram. The hologram may be augmented by overhead, backlighting or side lighting using halogen or other illuminating techniques. White or black backgrounds may also be mounted in the holographic area. The distance of the laser of up to 1.5 meters away from the Child Plates or any closer distance may be achieved to maximize the holographic players' efficiency. Multiple lasers may be used to augment images or image components such as brightening/sharpening colors, reducing fringe, speckle and other forms of laser distortion of the image. The size of the image shall be a correlation between the original holographic plate images, and the size and accuracy of the laser in the holographic player, along with the hologram image quality of the individual Child Plate.

Confirming with FIG. 6A, holography disk player 600 is powered through conventional power source 603 or other power sources. A networked computer 605 may provide further program instructions for ready master holographic media 400 as described above.

While this invention has been particularly shown and described with references to example embodiments thereof, it will be understood by those skilled in the art that various changes in form and details may be made therein without departing from the scope of the invention encompassed by the appended claims.

What is claimed is:

1. A system for storing holographic media comprising:
   a master holographic medium; and
   a plurality of holographic images arranged on the master holographic medium, wherein each of the plurality of holographic images comprises a portion of a respective parent holographic plate of a plurality of parent holographic plates, wherein the respective parent holographic plate comprises a plurality of portions corresponding to identical holographic images as a single holographic image, and wherein the plurality of holographic images are configured to successively display a plurality of three-dimensional holographic images when the plurality of holographic images are illuminated with a light source.

2. The system of claim 1, wherein the portion is physically removed from the respective parent holographic plate at an angle corresponding to a reconstruction angle of a light source that illuminates the plurality of holographic images in displaying the plurality of three-dimensional holographic images.

3. The system of claim 1, wherein the plurality of holographic images comprise interlocking shapes and are placed on the master holographic medium in a locked arrangement.

4. The system of claim 1, wherein each of the plurality of holographic images is placed in a respective frame on the master holographic medium, and wherein the frame comprises locator information to identify a location of each of the plurality of holographic images.

5. The system of claim 1, wherein the plurality of holographic images comprise mirrored bottoms.

6. The system of claim 1, wherein the master holographic medium comprises a duplicate copy of one or more of the plurality of holographic images.

7. The system of claim 1, wherein the master holographic medium further comprises a contact strip, and wherein the plurality of holographic images are addressable via the contact strip.

8. The system of claim 1, wherein the master holographic medium further comprises a storage region for storing non-holographic data, and wherein each of the plurality of holographic images is individually synchronized with the non-holographic data.

9. The system of claim 8, wherein the non-holographic data comprises audio data.

10. The system of claim 1, wherein each of the plurality of holographic images comprises the entire holographic image data of the respective parent holographic plate.

11. The system of claim 1, wherein the portion of the respective parent holographic plate is removed from the respective parent holographic plate to form the single holographic image that is arranged on the master holographic medium together with the plurality of holographic images as a frame sequence of a motion picture, and wherein other portions of the plurality of portions are removed from the master holographic medium to form other copies of the motion picture comprising the plurality of holographic images and the single holographic image arranged as the same frame sequence.

12. The system of claim 1, wherein the plurality of three-dimensional holographic images are displayed as a motion picture when the plurality of holographic images are sequentially illuminated.

13. The system of claim 12, wherein the plurality of three-dimensional holographic images are arranged in a predetermined order corresponding to a frame sequence of a first copy of the motion picture, wherein a second portion of the respective parent holographic plate is removed to create a second holographic image arranged on a second holographic medium in a same frame sequence as the single holographic image in the first copy of the motion picture.

14. A method, comprising:
   removing a portion of a parent holographic plate to form a single Child Plate, wherein a plurality of portions of the parent holographic plate are removed to form separate Child Plates; and
   arranging a plurality of Child Plates on a master holographic medium, wherein each Child Plate of the plurality of Child Plates comprises a recorded holographic image obtained from a respective parent holographic plate of a number of parent holographic plates, and wherein the plurality of Child Plates are configured to display a plurality of three-dimensional holographic images when the plurality of Child Plates are illuminated.

15. The method of claim 14, wherein each one of the number of parent holographic plates comprises original holographic image data, and wherein the separate Child Plates comprise identical image data as the original holographic image data.

16. The method of claim 14, further comprising physically removing the plurality of Child Plates from the number of parent holographic plates at an angle corresponding to a reconstruction angle of a light source that illuminates the plurality of Child Plates in displaying the plurality of three-dimensional holographic images.

17. The method of claim 14, wherein each Child Plate is removed with nanotechnology cutting tools.

18. The method of claim 14, wherein the plurality of Child Plates are arranged on the master holographic medium via an optical tweezing technique.

19. The method of claim 14, wherein the plurality of Child Plates are arranged on the master holographic medium in a predetermined order corresponding to a frame sequence of a first copy of a motion picture, and wherein the method further comprises:
   removing a second portion of the number of parent holographic plates to form respective second Child Plates; and
   arranging the second Child Plates in the same frame sequence as in the first copy of the motion picture.

20. The method of claim 14, further comprising coupling the plurality of Child Plates to the master holographic medium using an adhesive.

21. The method of claim 14, further comprising placing the plurality of Child Plates on the master holographic medium via a magnetic force.

22. The method of claim 14, further comprising placing the plurality of Child Plates on the master holographic medium in a locked arrangement, wherein each Child Plate comprises an interlocking shape.

23. The method of claim 14, further comprising:
placing each Child Plate in a respective frame of the master holographic medium; and
providing locator information on each respective frame.

24. The method of claim 14, further comprising providing a back-up copy of one or more of the plurality of Child Plates on the master holographic medium.

25. The method of claim 14, further comprising accessing each Child Plate via a dynamic library link.

26. The method of claim 14, further comprising:
providing a contact strip on the master holographic medium; and
addressing one or more of the plurality of Child Plates via the contact strip.

27. The method of claim 14, further comprising:
storing non-holographic data on the master holographic medium; and
synchronizing the plurality of Child Plates with the non-holographic data.

28. The method of claim 14, further comprising:
removing the plurality of Child Plates from the number of parent holographic plates; and
arranging the plurality of Child Plates on corresponding master holographic media that are separately configured as multiple copies of the plurality of three-dimensional holographic images.

29. An apparatus, comprising:
means for physically removing a first portion of a parent holographic plate to form a first holographic image, wherein the parent holographic plate comprises original holographic image data;
means for physically removing a plurality of portions from a set of parent holographic plates, wherein the plurality of portions form a plurality of separate holographic images;
means for arranging the first holographic image on a first master holographic medium together with the plurality of separate holographic images in a frame sequence of a first copy of a motion picture;
means for physically removing a second portion of the parent holographic plate to form a second holographic image, wherein both the first and second portions of the parent holographic plate comprise the original holographic image data; and
means for arranging the second holographic image on a second master holographic medium together with the plurality of separate holographic images having the same frame sequence as the first copy of the motion picture.

30. The apparatus of claim 29, wherein the set of parent holographic plates correspond in number to the plurality of separate holographic images.

* * * * *